Jan. 18, 1927.
H. W. BOYD
DIRIGIBLE HEADLIGHT
Filed April 6, 1926
1,614,866
2 Sheets-Sheet 1
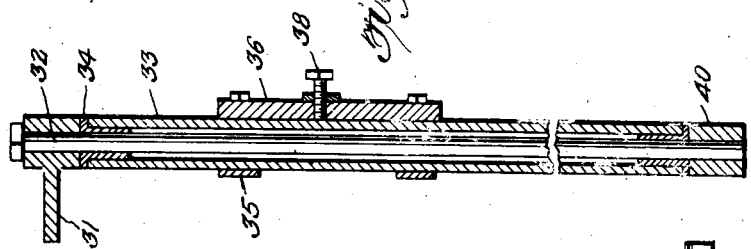
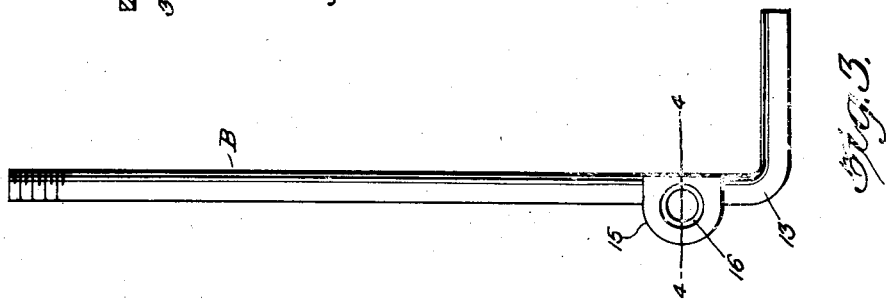
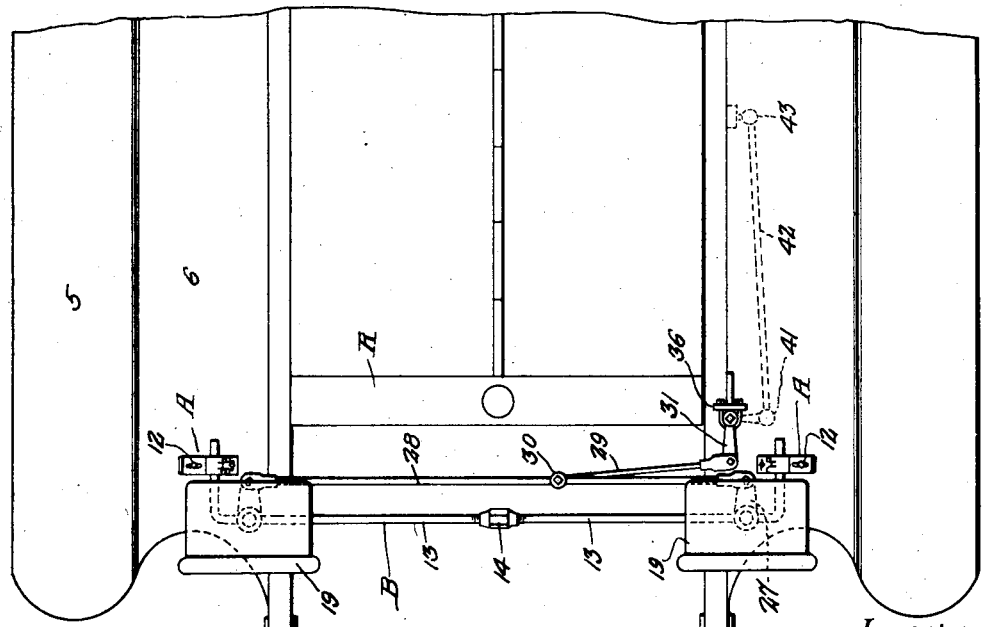
Inventor
H. W. Boyd,
By Clarence A. O'Brien
Attorney Jan. 18, 1927.
H. W. BOYD
1,614,866
DIRIGIBLE HEADLIGHT
Filed April 6, 1926  2 Sheets-Sheet 2
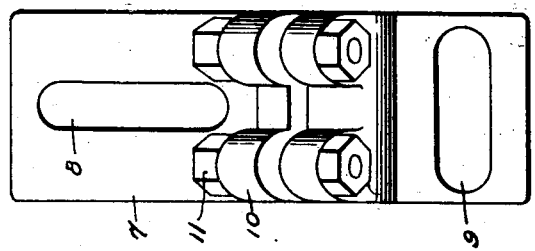
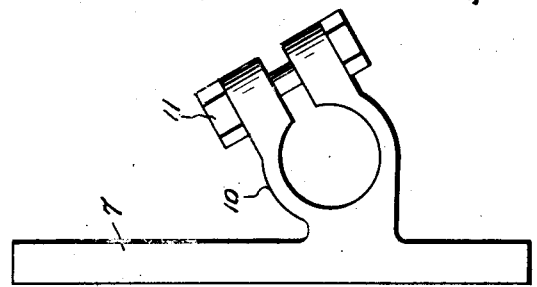
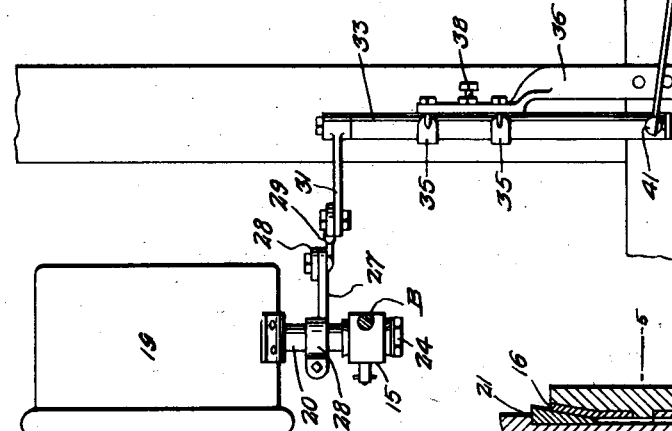
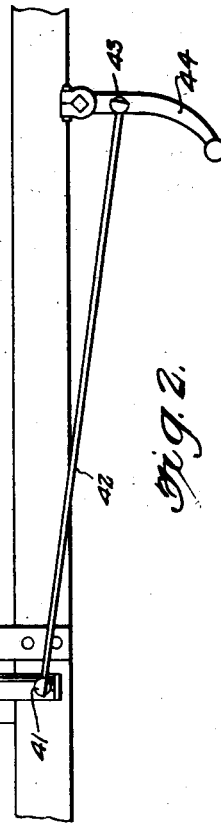
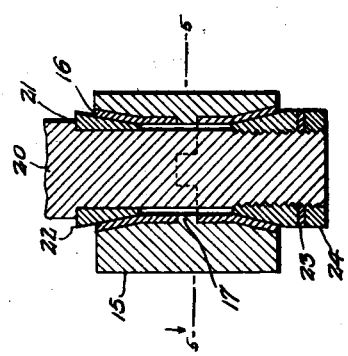
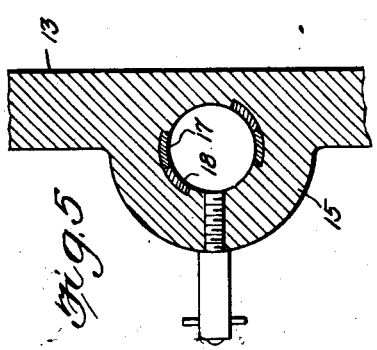
Inventor
H. W. Boyd,
By Clarence A. O'Brien
Attorney Patented Jan. 18, 1927.

1,614,866

UNITED STATES PATENT OFFICE.

HOMER W. BOYD, OF PARKERSBURG, WEST VIRGINIA.

DIRIGIBLE HEADLIGHT.

Application filed April 6, 1926. Serial No. 100,113.

The present invention appertains to dirigible headlights for automobiles and like vehicles, and has for its principal object to provide a structure having adjustable features adapting it for mounting upon a large variety of different makes of automobiles.

Another very important object of the invention resides in the provision of a dirigible headlight mounting, having suitable adjustments to take care of the different shape in fenders of automobiles and allowing for the difference in distance therebetween.

Another very important object of the invention lies in the provision of a highly novel bracket for assisting in affording the adjustment above referred to.

Another detail object of the invention resides in the provision of a highly novel and efficient bearing structure for mounting the standards of the dirigible headlights in the supporting structure.

A still further very important object of the invention is to provide headlight structure of this nature which is exceedingly simple in its construction, compact, inexpensive to manufacture, easy to manipulate and adjust, efficient and reliable in operation, convenient, readily assembled and disassembled, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter fully described and claimed.

In the drawing:—

Figure 1 is a fragmentary top plan view of an automobile, showing the forward portion thereof, with my improved dirigible headlights associated therewith, Fig. 2 is a side elevation thereof showing parts in section and some parts left out for clearness, Fig. 3 is a detail plan view showing one end of the bracket bar, Fig. 4 is an enlarged detail section taken substantially on the line 4—4 of Fig. 3, and shows parts in the opening of the enlargement of the bar B.

Fig. 5 is a transverse horizontal section taken substantially on the line 5—5 of Fig. 4, the standard not being shown.

Fig. 6 is a vertical longitudinal section thru a bearing sleeve forming part of the operating mechanism for the dirigible headlights, Fig. 7 is an edge elevation of one of the improved brackets, and Fig. 8 is a plan view thereof.

Referring to the drawing in detail, it will be seen that the numerals 5 denote the front fenders of an automobile, and 6 the side aprons thereof. Brackets A are mounted on the aprons 6. The structure of these brackets is illustrated to advantage in Figs. 7 and 8.

Referring to one of the brackets in detail, it will be seen that the numeral 7 denotes a rectangular shaped plate having a longitudinally extending slot 8 at one end and a transversely extending slot 9 at the other end thereof. A clamp structure 10 is formed integrally with an intermediate portion of the plate 7 between the slots 8 and 9. This clamp structure 10 may be tightened by the operation of bolts and nuts designated generally by the numeral 11.

Fastening elements are adapted to pierce the slots 8 and 9 as is indicated at 12 in Fig. 1. A bracket bar B includes a pair of L-shaped sections 13, the terminals of the longer thereof being threaded and engaged and connected together by a turn buckle 14, while the smaller arms thereof are received in the clamps 10. Thus this bracket bar B may be adjusted forwardly or rearwardly in relation to the radiator R of the automobile, and the length of the bar may be adjusted by proper manipulation of the turn buckle 14. Thus this supporting structure is adaptable to a large number of different makes of automobiles now on the market.

Each section 13 of the bracket bar B has an enlarged portion 15 in the larger arm thereof adjacent the shorter arm. The enlargement functions as a bearing. The bore 16 of each bearing is frusto-conical in formation at the upper and lower ends thereof for receiving similarly shaped bushings. Inwardly projecting lugs are provided centrally of the bore of the bearing as is denoted at 17 and the spaces between the lugs receive lugs which project from the bushings 16 is denoted at 18 in Fig. 5. The headlights 19 are provided with standards 20 for operation in the bearings. The lower ends of these standards are reduced for forming shoulders 21. The reduced ends of the standards operate in the bushings through frusto-conical bearings 22, the lower ones of which are threadedly engaged with the reduced ends, and locked in place by lock washers 23 and lock nuts 24.

The shoulders 21 rest against the bearings 22 as is clearly shown in Fig. 4. The lugs 17 and 18 prevent the rotation of the bushings 16 in the bores of the enlargements 15. Arms 27 are clamped as at 28 on the standards 20 and project rearwardly therefrom and are pivotally connected with a rod 28 which extends in parallelism with the bracket bar B. The dirigible headlights will oscillate in unison. A link 29 is pivotally engaged as at 30 within an intermediate portion of the connecting rod 28 and is pivotally connected at its other end to a crank 31 on the upper end of a shaft 32 rotatable in a bearing sleeve 33 having bushings 34 in the ends thereof. This bearing sleeve 33 is mounted in clamps 35 on a bracket 36 fixed to the chassis of the automobile.

A set screw 38 is threaded through the bracket 36 for frictionally engaging the bearing sleeve 33 so that said bearing sleeve may be readily adjusted. A crank 40 is mounted on the lower end of the shaft 32 and has a ball and socket connection 41 with a rod 42. This rod 42 has a ball and socket connection 43 with a steering arm 44 forming part of the steering mechanism of the automobile. Thus the dirigible headlight will oscillate to the right or left in unison with the steering of the automobile.

It is thought that the construction, operation, and advantages of this invention will now be clearly understood by those skilled in this art without a more detailed description thereof. It is to be noted that with the various adjustments described in detail above, that it is possible to mount this dirigible headlight structure on practically all makes of automobiles. The brackets A are capable of being placed in any position and at any angle which may be desired, owing to the particular shape of the aprons 6 of the fenders. The bearing sleeve 33 is capable of vertical adjustment so as to compensate for the differences which may be found in the steering gears of different makes of automobiles, and to compensate for the difference in height of the headlights in relation to the chassis and ground. In spite of the large number of desirable adjustments possible, the structure is exceedingly simple and compact, also possessing superior convenience and ease in operation.

None of the parts are likely to become easily out of order and they are of such a formation as to be capable of economical manufacture, easy assembly and disassembly, and yet may be constructed strong and durable. The present embodiment of the invention has been disclosed in detail merely by way of example, since in actual practice it attains the features of advantage enumerated as desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. A dirigible headlight structure including, in combination, a pair of headlights, standards on which the headlights are mounted, a bracket bar including a pair of L-shaped sections, the longer arms of the sections being threaded at their terminals, a turn buckle engaged with the threaded terminals, said longer arms being provided adjacent the shorter arms with enlargements having bores to form bearing for receiving the standards of the headlights, a pair of brackets, each including a plate of rectangular formation having a longitudinally extending slot at one end and a transversely extending slot at the other end, clamps on the intermediate portion of the plate, said clamps adapted to receive the shorter arms of the sections, cranks extending from the standards, and means for operating the cranks for swinging the headlights.

2. A dirigible headlight structure including, in combination, a pair of headlights, standards on which the headlights are mounted, a bracket bar including a pair of L-shaped sections, the longer arms of the sections being threaded at their terminals, a turn buckle engaged with the threaded terminals, said longer arms being provided adjacent the shorter arms with enlargements having bores to form bearings for receiving the standards of the headlights, a pair of brackets, each including a plate of rectangular formation having a longitudinally extending slot at one end and a transversely extending slot at the other end, clamps on the intermediate portion of the plate, said clamps adapted to receive the shorter arms of the sections, cranks extending from the standards, a connecting rod between the cranks, a link engaged with the connecting rod, a bearing sleeve, means for mounting the bearing sleeve so that it may be adjusted vertically, a shaft rotatable in the bearing sleeve, a crank on the upper end of the shaft engaged with the link, a shank on the lower end of the shaft, a rod having a ball and socket engagement with the lower crank of the shaft.

3. A dirigible headlight structure including, in combination, a pair of headlights, standards on which the headlights are mounted, a bracket bar including a pair of L-shaped sections, the longer arms of the sections being threaded at their terminals, a turn buckle engaged with the threaded terminals, said longer arms being provided adjacent the shorter arms with enlargements having bores to form bearings for receiving the standards of the headlights, a pair of brackets, each including a plate of rectangular formation having a longitudinally extending slot at one end and a transversely extending slot at the other end, clamps on the intermediate portion of the plate, said clamps adapted to receive the shorter arms of the sections, cranks extending from the standards, each bearing provided in each section of the bracket bar having a bore tapered inwardly of its ends for receiving frusto-conical bushings, each bushing provided with lugs, lugs projecting interiorly of the bores of the bearings for engaging the lugs of the bushings to prevent rotation of the bushings, frusto-conical thrusts mounted in the bushings, the lower ends of the standards being reduced for reception in the thrusts.

4. A dirigible headlight structure including, in combination, a pair of headlights, standards on which the headlights are mounted, a bracket bar including a pair of L-shaped sections, the longer arms of the sections being threaded at their terminals, a turn buckle engaged with the threaded terminals, said longer arms being provided adjacent the shorter arms with enlargements having bores to form bearings for receiving the standards of the headlights, a pair of brackets, each including a plate of rectangular formation having a longitudinally extending slot at one end and a transversely extending slot at the other end, clamps on the intermediate portion of the plate, said clamps adapted to receive the shorter arms of the sections, cranks extending from the standards, each bearing provided in each section of the bracket bar having a bore tapered inwardly of its ends for receiving frusto-conical bushings, each bushing provided with lugs, lugs projecting interiorly of the bores of the bearings for engaging the lugs of the bushings to prevent rotation of the bushings, frusto-conical thrusts mounted in the bushings, the lower ends of the standards being reduced for reception in the thrusts, one of the thrusts being threadedly engaged with each standard, and lock nuts being associated therewith.

In testimony whereof I affix my signature.

HOMER W. BOYD.